(12) United States Patent
Kamiya (10) Patent No.: US 7,911,560 B2
(45) Date of Patent: Mar. 22, 2011

(54) MULTIPLE-LAYER LIQUID CRYSTAL DISPLAY DEVICE HAVING A FLEXIBLE SUBSTRATE

(75) Inventor: Kiyoshi Kamiya, Saitama (JP)

(73) Assignee: Citizen Holding Co., Ltd., Tokyo (JP)

( * ) Notice: Subject to any disclaimer, the term of this patent is extended or adjusted under 35 U.S.C. 154(b) by 683 days.

(21) Appl. No.: 11/931,708

(22) Filed: Oct. 31, 2007

(65) Prior Publication Data

US 2008/0100789 A1    May 1, 2008

(30) Foreign Application Priority Data

Oct. 31, 2006  (JP) ................................ 2006-295448

(51) Int. Cl.
  *G02F 1/1347* (2006.01)
  *G02F 1/1335* (2006.01)
  *G02F 1/1343* (2006.01)

(52) U.S. Cl. .............. 349/74; 349/12; 349/77; 349/149; 349/150

(58) Field of Classification Search ................ 349/12, 349/74, 77, 82, 149–152
See application file for complete search history.

(56) References Cited

U.S. PATENT DOCUMENTS

| 2002/0033911 A1* | 3/2002 | Ishida et al. ................. 349/74 |
| 2002/0054261 A1* | 5/2002 | Sekiguchi ................... 349/122 |
| 2006/0158590 A1* | 7/2006 | Matsushima ................ 349/117 |

FOREIGN PATENT DOCUMENTS

| JP | 58-5720 A | 1/1983 |
| JP | 60-143423 U | 9/1985 |
| JP | 2001-154178 A | 6/2001 |
| JP | 2004-93627 A | 3/2004 |
| JP | 2005-17567 A | 1/2005 |

OTHER PUBLICATIONS

Notification of Reasons for Refusal dated Oct. 10, 2008 (dispatch date), issued in corresponding Japanese Patent Application No. 2006-295448.

* cited by examiner

*Primary Examiner* — Michael H Caley
(74) *Attorney, Agent, or Firm* — Westerman, Hattori, Daniels & Adrian, LLP (57) ABSTRACT

The present invention provides a laminated liquid crystal display device having a configuration in which substrates for both panels can be electrically connected easily. The display device, which is implemented by multiple-layered liquid crystal cell panels configured by laminating a liquid crystal cell panel having a rigid panel substrate and a liquid crystal cell panel having a flexible panel substrate, makes use of the flexibility of the flexible panel substrate for making electrical connection between the flexible panel substrate and the rigid panel substrate. A part of the flexible panel substrate is protruded and, on this protrusion, electrode wire lines are provided for making electrical connection between the panel substrates. Bending the flexible panel substrate allows the electrode wire lines, formed on the protrusion, to be brought into contact with the rigid panel substrate.

19 Claims, 11 Drawing Sheets

MULTIPLE-LAYER LIQUID CRYSTAL DISPLAY DEVICE HAVING A FLEXIBLE SUBSTRATE

BACKGROUND OF THE INVENTION

1. Field of the Invention

The present invention relates to a display device, and more particularly to a laminated liquid crystal display device.

2. Description of the Related Art

A laminated liquid crystal display device, in which substrates such as liquid crystal substrates are laminated, is known as a liquid crystal display device. There are several types of laminated liquid crystal display device of this type. Among them are a display device that has a touch input panel laminated on the front of a display panel formed by a liquid crystal substrate and a display device that has two laminated display panels.

Figure 11:
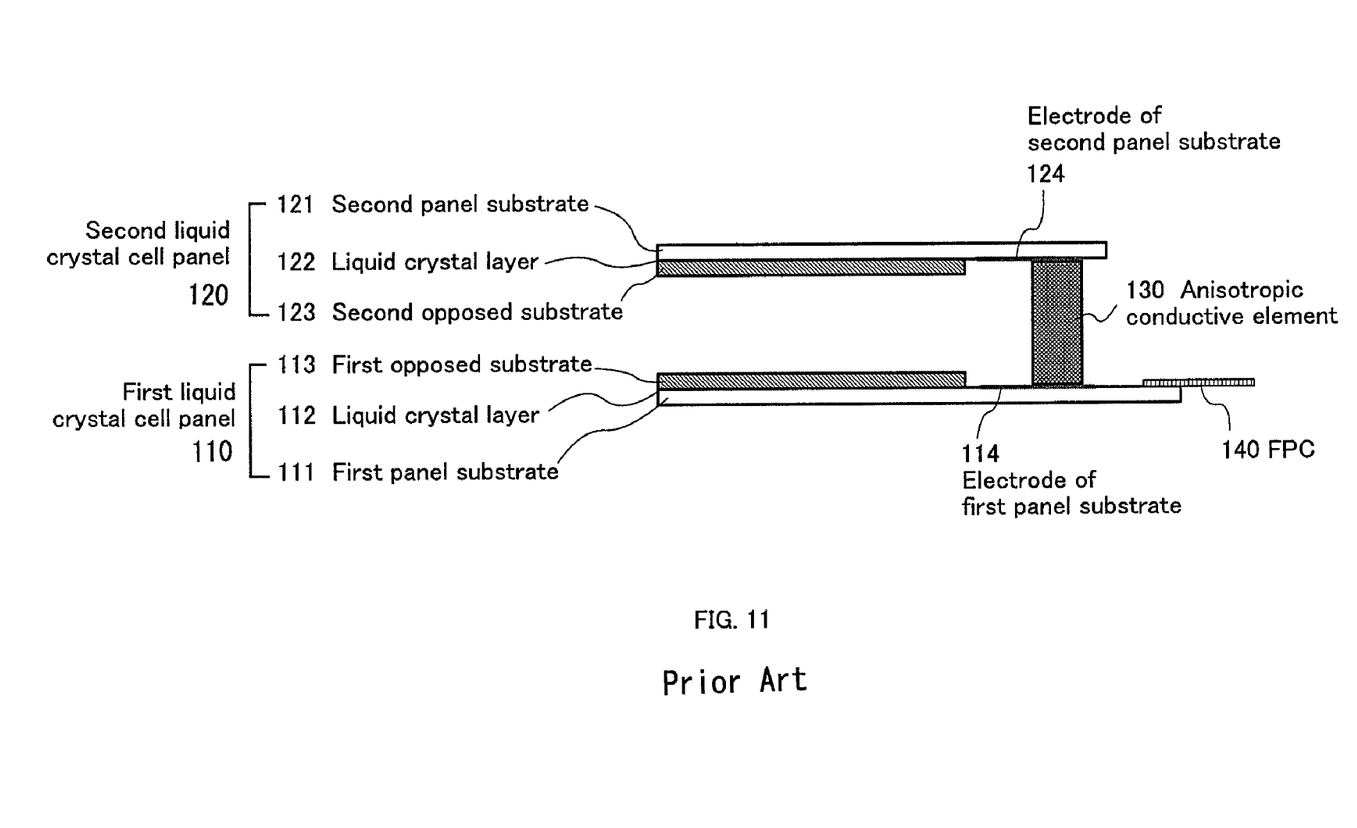
FIG. 11 is a diagram showing one example of the configuration of a laminated liquid crystal display device that is conventionally known.

FIG. 11 is a diagram showing an example of one configuration of a laminated liquid crystal display device that is conventionally known. In the example of the configuration shown in FIG. 11, first liquid crystal cell panel 110 and second liquid crystal cell panel 120 are laminated. The first liquid crystal cell panel 110 has a configuration in which a liquid crystal layer 112 is held between a first panel substrate 111 and a first opposed substrate 113. The second liquid crystal cell panel 120 has the similar configuration in which a liquid crystal layer 122 is held between a second panel substrate 121 and a second opposed substrate 123. An electrode 114 is provided on the first panel substrate 111, an electrode 124 is provided on the second panel substrate 121. Those electrodes are provided to supply the liquid crystal panel a driving signal or to output a signal detected on the touch panel.

The liquid crystal display device is one display assembly composed of the first liquid crystal cell panel 110 and the second liquid crystal cell panel 120. Normally, the driving signal is supplied to, and a detected signal is output from, this display assembly via one wire line. In some cases, the first liquid crystal cell panel 110 and the second liquid crystal cell panel 120 are driven in synchronization with each other.

To satisfy the requirements described above, the liquid crystal display device has one wire line (FPC 140 in FIG. 11) via which input/output is performed with an external device and, within the liquid crystal display device, signals are branched between the first liquid crystal cell panel 110 and the second liquid crystal cell panel 120. Because the first liquid crystal cell panel 110 and the second liquid crystal cell panel 120 are laminated, the first panel substrate 111 and the second panel substrate 121, which are separated, must be connected electrically.

Conventionally, a configuration is known in which a conductive element 130, such as an anisotropic conductive element, is provided between the first panel substrate 111 and the second panel substrate 121 to electrically connect between those panel substrates.

In the laminated configuration in which two panels are provided on both sides of an intermediate substrate with this intermediate substrate as the common substrate, another configuration is proposed in which the two panels are configured by bending one film substrate in order to establish an electrical connection between the two panels (for example, see Patent Document 1).

[Patent Document 1] Japanese Patent Laid-Open Publication No. 2001-154178

In the configuration described above in which the conductive element 130 is held between the first panel substrate 111 and the second panel substrate 121 to electrically connect between both panel substrates, it is desired that this conductive element 130 be electrically connected properly to the first panel substrate 111 and the second panel substrate 121. To satisfy this requirement, the first panel substrate 111 and the second panel substrate 121 are rigid enough to press the conductive element 130 on the panel substrates.

On the other hand, when the panel substrate of one of the liquid crystal cell panels is made of a flexible material such as plastic, the panel substrate is not rigid enough for the panel substrate alone to press the conductive element 130 on the panel substrate. In this case, there is a possibility that the electrical contact is insufficient. To press the conductive element on the panel substrate properly, a press structure such as an enclosure for enclosing the liquid crystal cell panel must be provided separately.

One of the problems with the configuration described in Patent Document 1 given above is that, though there is no need for a conductive element for electrically connecting the two panel substrates, the electrodes for each liquid crystal panel must be formed on both faces (rear face and front face) of the intermediate substrate shared by both panel substrates. Another problem is that the formation process of the liquid crystal panel becomes complicated because liquid crystal must be injected into the empty cell panels formed on both faces on the intermediate substrate.

SUMMARY OF THE INVENTION

Therefore, it is an object of the present invention to solve the problems of the prior art which are described above. More specifically, an object of the present invention is to provide a configuration in which the panel substrates are electrically connected easily in a laminated liquid crystal display device.

The display device of the present invention, which is implemented by multiple-layered liquid crystal cell panels configured by laminating a liquid crystal cell panel having a rigid panel substrate and a liquid crystal cell panel having a flexible panel substrate, makes use of the flexibility of the flexible panel substrate for making electrical connection between the flexible panel substrate and the rigid panel substrate. A part of the flexible panel substrate is protruded and, on this protrusion, electrode wire lines are provided for making electrical connection between the panel substrates. Bending the flexible panel substrate allows the electrode wire lines, formed on the protrusion, to be brought into contact with the rigid panel substrate, thereby providing proper electrical connection.

The display device of the present invention has multiple-layer liquid crystal cell panels configured by a first liquid crystal cell panel and a second liquid crystal cell panel which are stacked in layers, wherein the first liquid crystal cell panel has a first opposed substrate laminated on a rigid first panel substrate with a liquid crystal layer between the first opposed substrate and the first panel substrate. The second liquid crystal cell panel has a second opposed substrate laminated on a flexible second panel substrate with a liquid crystal layer between the second opposed substrate and the second panel substrate. At least a part of the second panel substrate is bent to allow the second panel substrate to be connected to electrodes formed on the first panel substrate.

The first panel substrate has an extension portion formed by extending at least one end thereof beyond the first opposed substrate and the electrodes are formed on the extension portion. The second panel substrate has a protrusion, which is a part of the second panel substrate protruded from at least one end thereof, and electrode wire lines for making connection with the electrodes are provided on the protrusion and the protrusion is bent to allow the electrode wire lines to be connected to the electrodes.

When the wire lines for connection with an external device are provided on the first panel substrate side, the electrical connection between the second panel substrate and the external device is made via the electrode wire lines provided on the first panel substrate and the protrusion of the second panel substrate.

The width of the protrusion provided on the second panel substrate need not be the full width of the second panel substrate but may be determined according to the number of electrode wire lines provided on the protrusion. For example, when the second liquid crystal cell panel is used as a viewing angle adjustment panel, the second panel substrate, which is statically driven for the on/off control, is required to have only two electrode wire lines and, so, the protrusion is required to be wide enough only for the two electrode wire lines to be installed. When the second liquid crystal cell panel is used as a touch sensor cell panel, only two electrode wire lines for the position control are required and, so, the width protrusion may be narrowed.

In one mode of the display device of the present invention, the electrodes of the first panel substrate are provided on a substrate face facing a first opposed substrate, the electrodes of the second panel substrate are provided on a substrate face facing a second opposed substrate, the first liquid crystal cell panel and the second liquid crystal cell panel are laminated with the first opposed substrate and the second panel substrate opposed each other wherein the opposed substrate of the first liquid crystal cell panel and the opposed substrate of the second liquid crystal cell panel are oriented in the same direction, and the protrusion of the second panel substrate is bent 180 degrees with respect to a protrusion direction thereof to turn inside out to allow leading positions of the electrode wire lines to be connected to the electrodes on the extension portion of the first panel substrate.

This configuration, in which the opposed substrate of the first liquid crystal cell panel and the opposed substrate of the second liquid crystal cell panel are oriented in the same direction, allows the electrodes on the first panel substrate and the electrodes on the second panel substrate to be electrically connected without providing a separate electrical connection member such as a conductive element.

In another mode of the display device of the present invention, the electrodes of the first panel substrate are provided on a substrate face facing a first opposed substrate, the electrodes of the second panel substrate are provided on a substrate face facing a second opposed substrate, the first liquid crystal cell panel and the second liquid crystal cell panel are laminated with the first opposed substrate and the second opposed substrate opposed each other wherein the opposed substrate of the first liquid crystal cell panel and the opposed substrate of the second liquid crystal cell panel face each other, and the protrusion of the second panel substrate is bent with respect to a protrusion direction thereof without turning inside out to allow the leading positions of the electrode wire lines to be connected to the electrodes on the extension portion of the first panel substrate.

This configuration, in which the opposed substrate of the first liquid crystal cell panel and the opposed substrate of the second liquid crystal cell panel are arranged face to face, allows the electrodes on the first panel substrate and the electrodes on the second panel substrate to be electrically connected without providing a separate electrical connection member such as a conductive element.

The rigid first panel substrate of the present invention is a glass substrate, and the flexible second panel substrate is a plastic substrate.

The electrode wire lines provided on the protrusion of the flexible second panel substrate of the present invention may be formed separately from the electrodes formed on the second panel substrate so that they are connected as necessary. The electrode wire lines provided on the protrusion of the flexible second panel substrate of the present invention may be separately formed as described above or may be integrated with the electrodes formed on the second panel substrate. When the electrode wire lines and the electrodes are formed integrally, they may be integrated with the liquid crystal panel electrodes by ITO.

Although the electrode wire lines, formed by ITO, have a relatively high electrical resistance, the second liquid crystal cell panel can obtain a sufficient electric current if used as a viewing angle adjustment panel or as a touch panel cell panel that consumes less power.

The configuration of the display device of the present invention can be applied not only to two-layer liquid crystal panels but also to three-layer liquid crystal cell panels.

The display device of the present invention, which is a laminated liquid crystal display device, provides a configuration in which the panel substrates can be electrically connected easily.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Preferred embodiments of a display device according to the present invention will be described in detail below. Referring to FIG. 1 to FIG. 8, four embodiments of a display device of the present invention, in which two layers of liquid crystal cell panels are used, will be described; referring to FIG. 9 and FIG. 10, an embodiment of a display device of the present invention, in which three layers of liquid crystal cell panels are used, will be described.

First, four embodiments of the display device of the present invention, in which two layers of liquid crystal cell panels are used, will be described with reference to FIG. 1 to FIG. 8. FIGS. 1-2 are diagrams showing a first embodiment, FIGS. 3-4 are diagrams showing a second embodiment, FIGS. 5-6 are diagrams showing a third embodiment, and FIGS. 7-8 are diagrams showing a fourth embodiment. A first liquid crystal cell panel forms a matrix-type TFT liquid crystal panel, and a second liquid crystal cell panel is a viewing angle adjustment panel.

In the first embodiment and the third embodiment, the opposed substrate of the first liquid crystal cell panel and the opposed substrate of the second liquid crystal cell panel are oriented in the same direction. In the second embodiment, the opposed substrate of the first liquid crystal cell panel and the opposed substrate of the second liquid crystal cell panel are oriented face to face.

The following describes a display device in the first embodiment of the present invention with reference to the cross section view and the top view in FIG. 1 and the perspective view in FIG. 2.

A display device 1A comprises a first liquid crystal cell panel 10 and a second liquid crystal cell panel 20 that are laminated. The first liquid crystal cell panel 10 has a liquid crystal layer 12 and a first opposed substrate 13 on a first panel substrate 11 with the liquid crystal layer 12 between the first panel substrate 11 and the first opposed substrate 13. The first panel substrate 11 is made of a rigid material, such as a glass substrate, with an extension portion 15 provided at least at one of its sides. The extension portion 15 is a portion that makes contact with a protrusion 25 (which will be described later) of the second liquid crystal cell panel 20 for making electrical connection. On the extension portion 15 are provided electrodes 14 of the first panel substrate. Two of the electrodes 14 of the panel substrate are electrically connected to electrode wire lines 24 and 26 provided on the protrusion 25 of the second liquid crystal cell panel 20.

On the other hand, the second liquid crystal cell panel 20 has a liquid crystal layer 22 and a second opposed substrate 23 on a second panel substrate 21 with the liquid crystal layer 22 between the second panel substrate 21 and the second opposed substrate 23. The second panel substrate 21 is made of a flexible material, such as a plastic substrate, with the protrusion 25 provided at least at one of its sides. The protrusion 25 is a portion that makes contact with the extension portion 15 of the first liquid crystal cell panel 10 for making electrical connection. On the protrusion 25 are provided the electrode wire lines 24 and 26. The leading portions of those electrode wire lines 24 and 26 are electrically connected to the electrodes 14 of the panel substrate provided on the extension portion 15 side of the first liquid crystal cell panel 10. The protrusion 25 of the second panel substrate 21 is bent 180 degrees with respect to the protrusion direction of the protrusion 25 to turn inside out so that the leading portion of the electrode wire line 26 is connected to the electrodes 14 on the extension portion 15 of the first panel substrate 11.

In the mode of the display device 1A, the electrodes of a shutter 27 formed on the second panel substrate 21 and the electrodes 14 formed on the first panel substrate 11 are oriented in the same direction, and the electrodes on the shutter 27 are provided on the opposite side to the electrodes 14 across the second panel substrate 21. Therefore, bending the protrusion 25 180 degrees to turn it inside out allows the electrode wire lines 24 and 26 to be connected to the electrodes 14 on the extension portion 15.

Figure 1A:
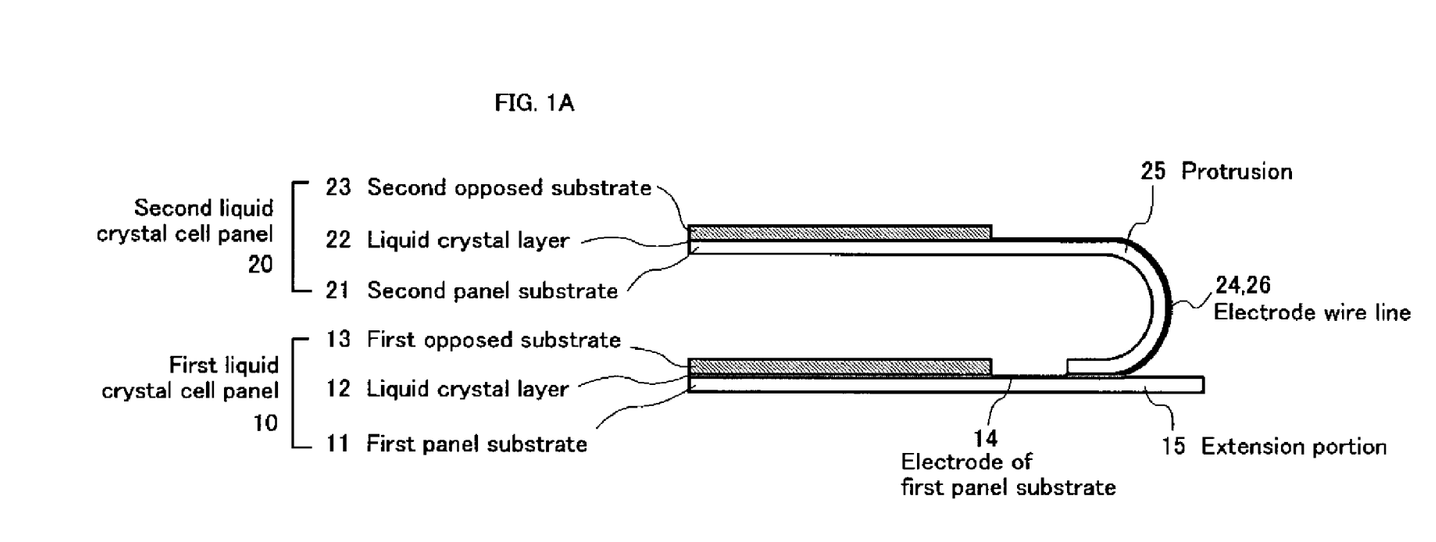
FIG. 1 is a cross section view and a top view showing a display device in a first embodiment of the present invention.

FIG. 1A is a diagram showing the cross section of the first liquid crystal cell panel 10 and the second liquid crystal cell panel 20. As shown in the figure, the protrusion 25 of the second liquid crystal cell panel is bent and is turned upside down to bring the electrode wire lines 24 and 26 from the top to the bottom so that the electrode wire lines 24 and 26 make contact with the electrodes 14 on the extension portion 15 of the first panel substrate 11 for making electrical connection.

Figure 1B:
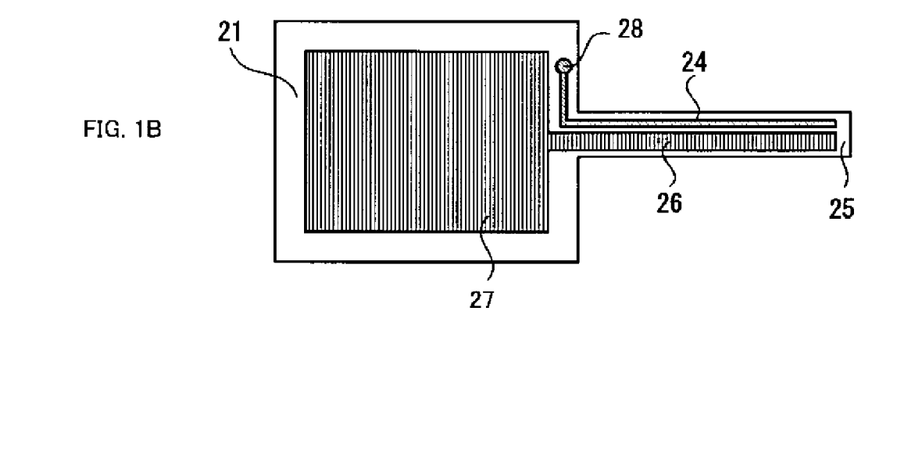

FIG. 1B is a top view of one mode of the second panel substrate 21. In this mode, a part of one side of the second panel substrate 21 is protruded to form the protrusion 25 on which the electrode wire lines 24 and 26 are provided. The electrode wire line 24 is connected to a vertical conducting via area 28, and the electrode wire line 26 is connected to the shutter 27 provided in the main part of the second panel substrate 21. The second opposed substrate 23 has a solid electrode in an area overlapping two-dimensionally with the shutter 27, and the solid electrode and vertical conducting via area 28 are connected with silver paste.

The connection structure of the first liquid crystal cell panel 10 and the second liquid crystal cell panel 20 has been described as a unit characterized as the problem solving means of the display device 1A. The following describes the function of the first liquid crystal cell panel 10 and the second liquid crystal cell panel 20. The first liquid crystal cell panel 10 forms a matrix TFT liquid crystal panel for displaying various letters and images. For this purpose, a polarizer, not shown, is provided on and under the first liquid crystal cell panel. The viewing angle adjustment panel, which is the second liquid crystal cell panel, also has a polarizer, not shown, on the opposed substrate 23.

The display area of the first liquid crystal cell panel 10 and the shutter 27 of the second liquid crystal cell panel 20 overlap two-dimensionally. The shutter 27 is divided into mesh units of areas arranged in grids, and the alignment direction of liquid crystal molecules of every other area is different from the alignment direction of liquid crystal molecules of another every other area, both vertically and horizontally.

When no voltage is applied to the liquid crystal layer, the second liquid crystal cell panel 20 directly transmits an image, displayed on the first liquid crystal cell panel 10, to ensure a wide viewing angle. When a predetermined voltage is applied to this liquid crystal layer to tilt the liquid crystal molecules, the viewing angle characteristics become different between every other area and another every other area and, as a result, the screen of the first liquid crystal cell panel 10 can be viewed correctly only from the front, and near the front, of the screen. Laminating the viewing angle adjustment panel, which is second liquid crystal cell panel, on the matrix TFT liquid crystal panel, which is the first liquid crystal cell panel 10, allows the screen to be switched between wide and narrow viewing angle by applying a voltage.

There is a method for mounting an integrated circuit on the extension portion 15 for driving the display electrodes of the first liquid crystal cell panel 10 (COG mounting method. COG stands for Chip On Glass). In this case, a driving signal generation circuit may be included easily in this integrated circuit, because the viewing angle adjustment panel, whose driving voltage is about 2V, consumes less power. When the driving signal generation circuit is included, two electrodes of the electrodes 14 on the first panel substrate receive signals from this integrated circuit and output the received signals to the electrode wire lines 24 and 26.

Figure 2A:
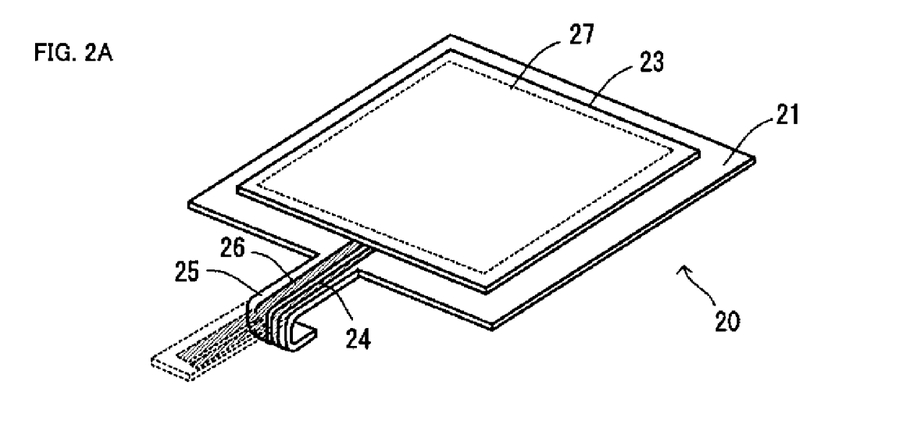
FIG. 2 is a perspective view showing the display device in the first embodiment of the present invention.
Figure 2B:
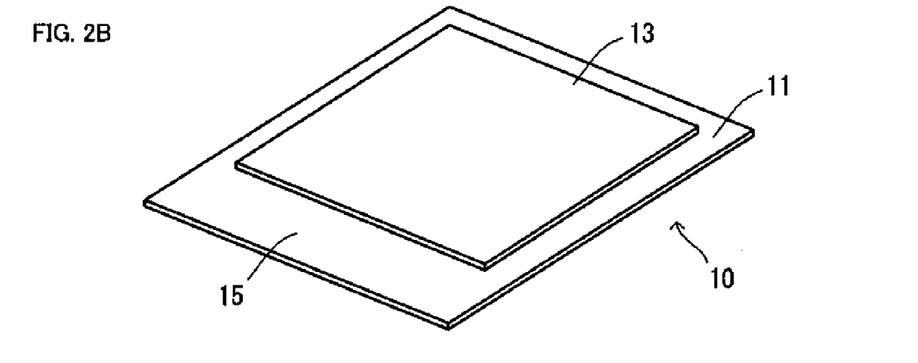
Figure 2C:
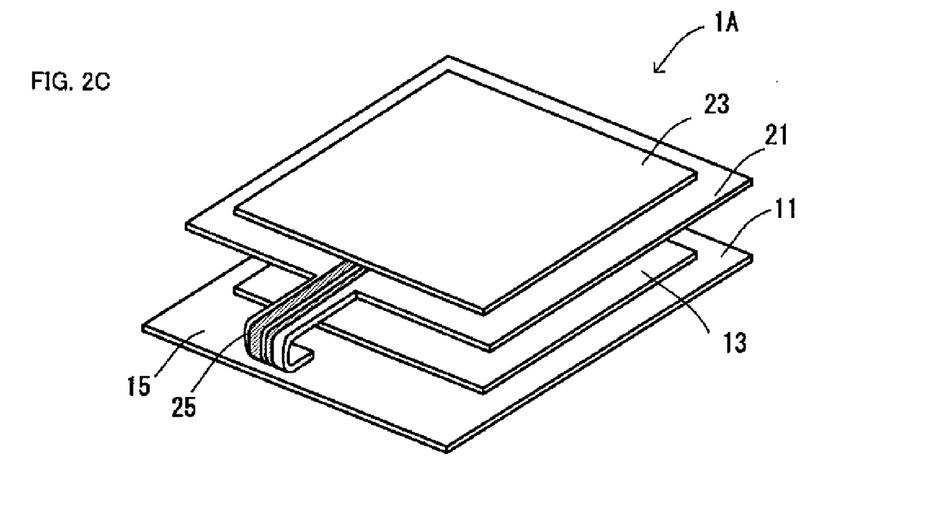

In the perspective view in FIG. 2, FIG. 2A shows the second liquid crystal cell panel 20, FIG. 2B shows the first liquid crystal cell panel 10, and FIG. 2C shows the display device 1A where the second liquid crystal cell panel 20 is laminated on the first liquid crystal cell panel 10.

The protrusion 25 of the second liquid crystal cell panel 20 is bent to allow the electrode wire lines 24 and 26, formed on the protrusion 25, to make contact with the electrodes 14 on the extension portion 15 side of the first liquid crystal cell panel 10 for making electrical connection.

Next, the following describes a display device in the second embodiment of the present invention with reference to the cross section view and the top view in FIG. 3 and the perspective view in FIG. 4.

As with the display device 1A, a display device 1B comprises a first liquid crystal cell panel 10 and a second liquid crystal cell panel 20 that are laminated.

The first liquid crystal cell panel 10 has a liquid crystal layer 12 and a first opposed substrate 13 on a first panel substrate 11 with the liquid crystal layer 12 between the first panel substrate 11 and the first opposed substrate 13. As in the first embodiment described above, the first panel substrate 11 is made of a rigid material, such as a glass substrate, with an extension portion 15 provided at least at one of its sides. The extension portion 15 is a portion that makes contact with a protrusion 25 of the second liquid crystal cell panel 20 for making electrical connection. On the extension portion 15 are provided electrodes 14 of the first panel substrate. Two of the electrodes 14 of the panel substrate are electrically connected to electrode wire lines 24 and 26 provided on the protrusion 25 of the second liquid crystal cell panel 20.

On the other hand, a second panel substrate 21 is made of a flexible material, such as a plastic substrate, with the protrusion 25 provided at least at one of its sides. The protrusion 25 is a portion that makes contact with the extension portion 15 of the first liquid crystal cell panel 10 for making electrical connection with the electrodes 14 of the first panel substrate. On the protrusion 25 are provided the electrode wires lines 24 and 26. The leading portions of those electrode wire lines 24 and 26 are electrically connected to the electrodes 14 of the panel substrate provided on the extension portion 15 side of the first liquid crystal cell panel 10. The protrusion 25 of the second panel substrate 21 is bent in the protrusion direction of the protrusion 25 with respect to the protrusion direction without being turned inside out so that the leading portions of the electrode wire lines 24 and 26 are connected to the electrodes 14 on the extension portion 15 of the first panel substrate 11.

In the mode of the display device 1B, the electrodes formed on both panel substrates are oriented face to face, and the electrode wire lines 24 and 26 are provided on the same face as that of the electrodes on the second panel substrate 21. Therefore, bending the protrusion 25 in the protrusion direction thereof without being turned inside out allows the electrode wire lines 24 and 26 to be connected to the electrodes 14 on the extension portion 15.

Figure 3A:
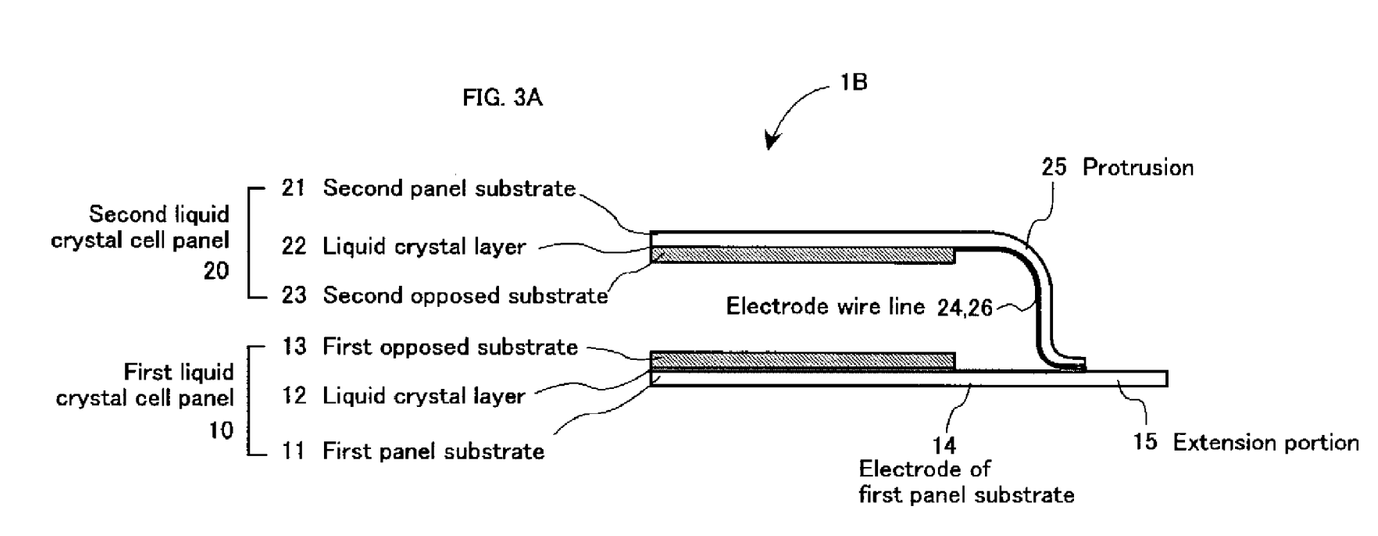
FIG. 3 is a cross section view and a top view showing a display device in a second embodiment of the present invention.

FIG. 3A is a diagram showing the cross section of the first liquid crystal cell panel 10 and the second liquid crystal cell panel 20. As shown in the figure, the protrusion 25 of the second panel substrate is bent with the vertical structural relation between the electrode wire lines 24 and 26 kept unchanged so that the electrode wire lines 24 and 26 make contact with the electrodes 14 on the extension portion 15 of the first panel substrate 11 for making electrical connection.

Figure 3B:
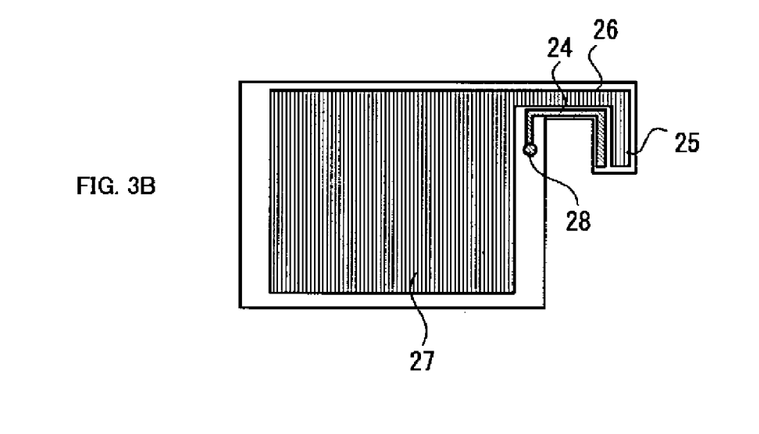

FIG. 3B is a top view of one mode of the second panel substrate 21. In this mode, a part of one side of the second panel substrate 21 is protruded to form the protrusion 25 and, on its reverse side, the electrode wire lines 24 and 26 are provided. The functions of a shutter 27, a vertical conducting via area 28, the first liquid crystal cell panel 10, and the second liquid crystal cell panel 20 are the same as those of the first embodiment.

Although the electrode wire lines 24 and 26 and the panel substrate electrodes 28 and 27 are integrated, another type of conductors may be used to increase the flexural strength. For example, the electrode wire lines 24 and 26 on the protrusion 25 may be made of gold-plated copper and the second panel substrate electrodes (27, 28, etc.) may be made of ITO.

Figure 4A:
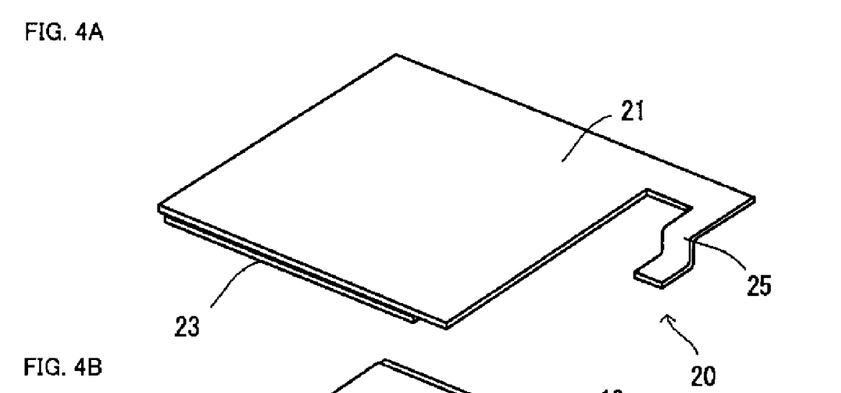
FIG. 4 is a perspective view showing the display device in the second embodiment of the present invention.
Figure 4B:
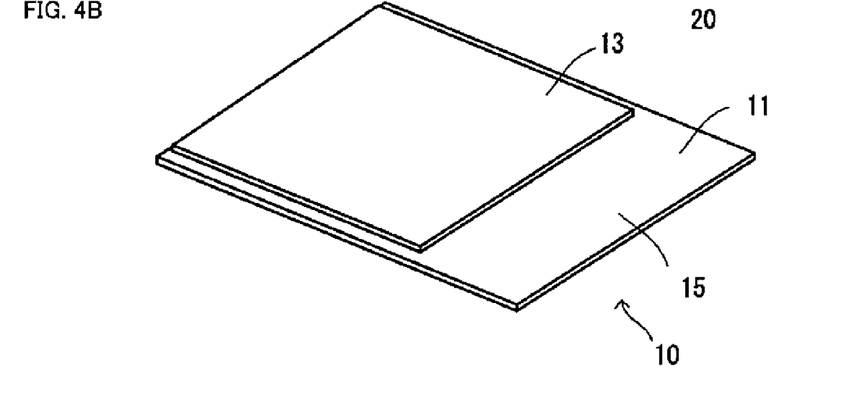
Figure 4C:
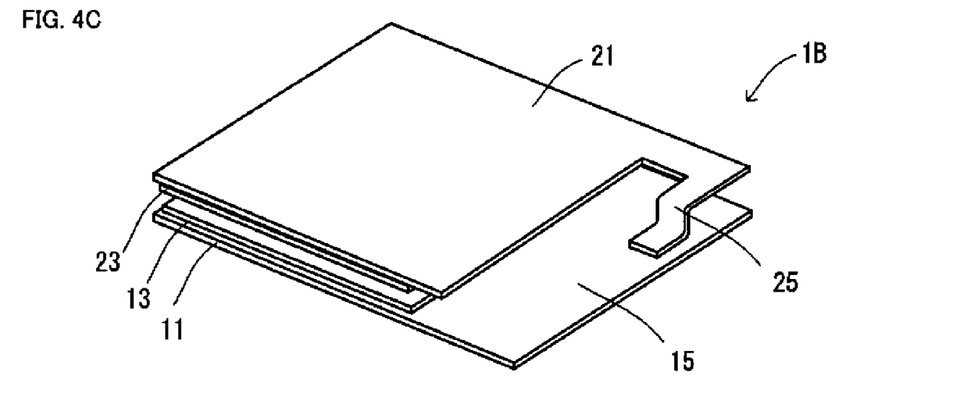

In the perspective view in FIG. 4, FIG. 4A shows the second liquid crystal cell panel 20, FIG. 4B shows the first liquid crystal cell panel 10, and FIG. 4C shows the display device 1B where the second liquid crystal cell panel 20 is laminated on the first liquid crystal cell panel 10.

The protrusion 25 of the second liquid crystal cell panel 20 is bent to allow the electrode wire lines 24 and 26, formed on the protrusion 25, to make contact with two of the electrodes 14 on the extension portion 15 side of the first liquid crystal cell panel 10 for making electrical connection.

Next, the following describes a display device in the third embodiment of the present invention with reference to the cross section view and the top view in FIG. 5 and the perspective view in FIG. 6.

As with the display device 1A and 1B described above, a display device 1C comprises a first liquid crystal cell panel 10 and a second liquid crystal cell panel 20 that are laminated.

The first liquid crystal cell panel 10 has a first opposed substrate 13 with a liquid crystal layer 12 under a first panel substrate 11. As with the first and second embodiments described above, the first panel substrate 11 is made of a rigid material, such as a glass substrate, with an extension portion 15 provided at least at one of its sides. The extension portion 15 is a portion that makes contact with a protrusion 25 of the second liquid crystal cell panel 20 for making electrical connection. On the extension portion 15 are provided electrodes 14 of the first panel substrate. Two of the electrodes 14 of the panel substrate are electrically connected to electrode wire lines 24 and 26 provided on the protrusion 25 of the second liquid crystal cell panel 20.

On the other hand, a second panel substrate 21 is made of a flexible material, such as a plastic substrate, with the protrusion 25 provided at least at one of its sides. The protrusion 25 is a portion that makes contact with the extension portion 15 of the first liquid crystal cell panel 10 for making electrical connection with the electrodes 14 on the first panel substrate. On the protrusion 25 are provided the electrode wire lines 24 and 26. The leading portions of those electrode wire lines 24 and 26 are electrically connected to two of the electrodes 14 of the panel substrate provided on the extension portion 15 side of the first liquid crystal cell panel 10. The protrusion 25 of the second panel substrate 21 is bent 180 degrees with respect to the protrusion direction of the protrusion 25 so that the leading portions of the electrode wire lines 24 and 26 are connected to the electrodes 14 on the extension portion 15 of the first panel substrate 11.

In the mode of the display device 1C, the opposed substrate of the first liquid crystal cell panel and that of the second liquid crystal cell panel are oriented in the same direction, and the electrodes 14 formed on the panel substrate and the electrode wire lines 24 and 26 formed on the protrusion 25 are oriented in the same direction. Therefore, bending the protrusion 25 180 degrees in the protrusion direction allows the electrode wire lines 24 and 26 to be connected to the electrodes 14 on the extension portion 15.

Figure 5A:
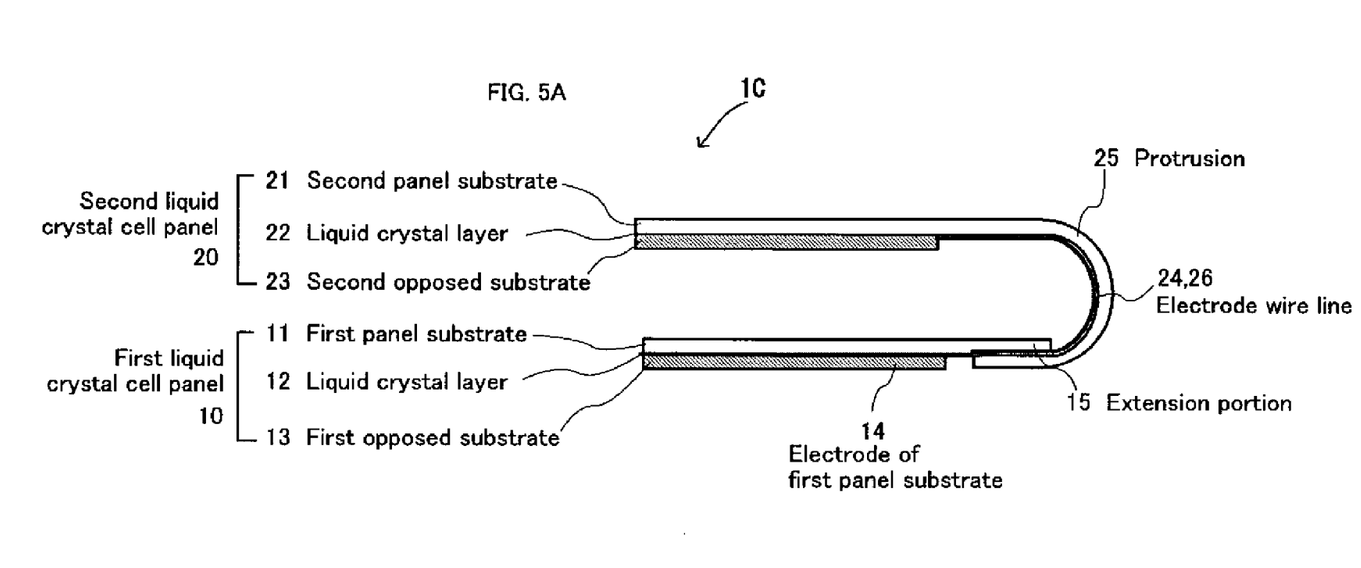
FIG. 5 is a cross section view and a top view showing a display device in a third embodiment of the present invention.

FIG. 5A is a diagram showing the cross section of the first liquid crystal cell panel 10 and the second liquid crystal cell panel 20. As shown in the figure, the protrusion 25 of the second panel substrate is bent to bring the electrode wire lines 24 and 26 under the first panel substrate 11 so that the electrode wire lines 24 and 26 make contact with the electrodes 14 on the extension portion 15 of the first panel substrate 11 from under the electrodes 14.

Figure 5B:
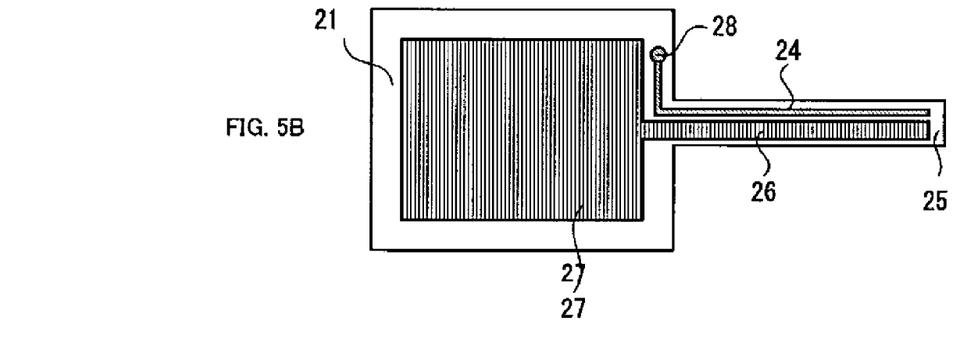

FIG. 5B is a top view of one mode of the second panel substrate 21. In this mode, a part of one side of the second panel substrate 21 is protruded to form the protrusion 25 on which the electrode wire lines 24 and 26 are provided.

Figure 6A:
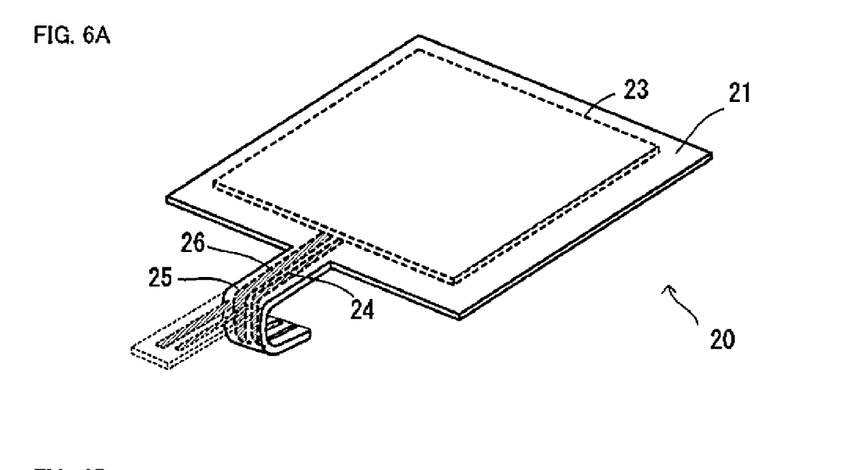
FIG. 6 is a perspective view showing the display device in the third embodiment of the present invention.
Figure 6B:
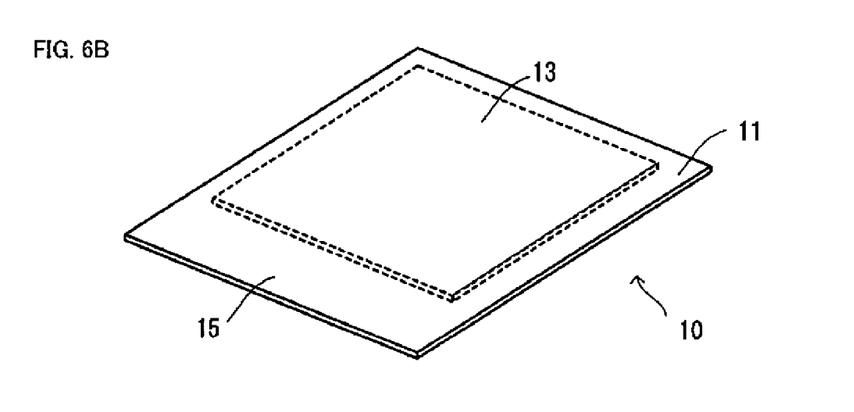
Figure 6C:
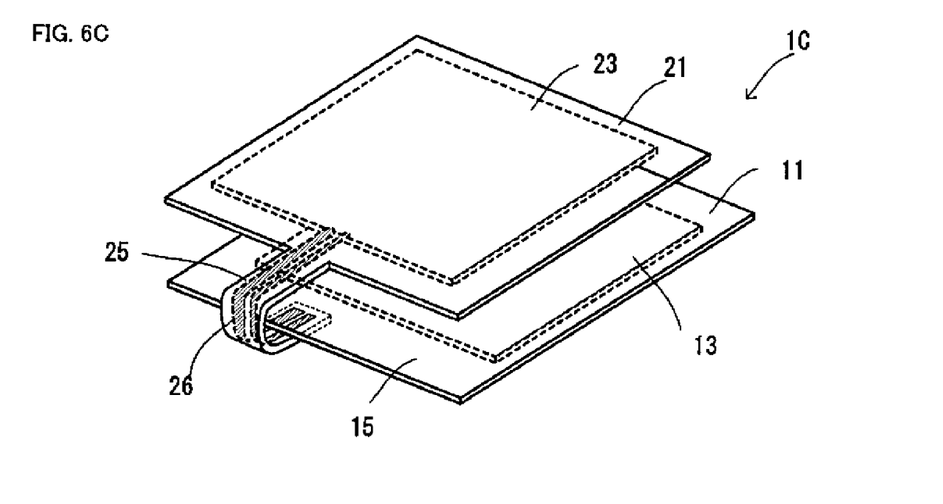

In the perspective view in FIG. 6, FIG. 6A shows the second liquid crystal cell panel 20, FIG. 6B shows the first liquid crystal cell panel 10, and FIG. 6C shows the display device 1C where the second liquid crystal cell panel 20 is laminated on the first liquid crystal cell panel 10.

The protrusion 25 of the second liquid crystal cell panel 20 is bent to allow the electrode wire lines 24 and 26, formed on the protrusion 25, to make contact with the electrodes 14 on the extension portion 15 side of the first liquid crystal cell panel 10 for making electrical connection.

Next, the following describes a display device in the fourth embodiment of the present invention with reference to the cross section view and the top view in FIG. 7 and the perspective view in FIG. 8.

As with the display devices 1A-1C described above, a display device 1D comprises a first liquid crystal cell panel 10 and a second liquid crystal cell panel 20 that are laminated.

The first liquid crystal cell panel 10 comprises a first opposed substrate 13 and a first panel substrate 11 with a liquid crystal layer 12 under first panel substrate 11. The first panel substrate 11 is made of a rigid material that is easy to machine into a desired shape, such as a rigid resin, with an extension portion 15 provided at least at one of its sides as in the first to third embodiments described above. The extension portion 15 is a portion that makes contact with a protrusion 25 of the second liquid crystal cell panel 20 for making electrical connection. An opening 16 is formed on the extension portion 15, and electrodes 14 of the first panel substrate are provided on the opposed substrate 13 side.

Two of the electrodes 14 of the panel substrate are electrically connected to electrode wire lines 24 and 26 provided on the protrusion 25 of the second liquid crystal cell panel 20.

On the other hand, a second panel substrate 21 is made of a flexible material, such as a plastic substrate, with the protrusion 25 provided at least at one of its sides. The protrusion 25 is a portion that makes contact with the extension portion 15 of the first liquid crystal cell panel 10 for making electrical connection with the electrodes 14 of the first panel substrate. On the protrusion 25 are provided the electrode wire lines 24 and 26. The leading portions of those electrode wire lines 24 and 26 are electrically connected to two of the electrodes 14 of the panel substrate provided on the extension portion 15 side of the first liquid crystal cell panel 10. The protrusion 25 of the second panel substrate 21 is bent with respect to the protrusion direction of the protrusion 25 to make it pass through the opening 16 so that the leading portions of the electrode wire lines 24 and 26 are connected to the electrodes 14 on the extension portion 15 of the first panel substrate 11 under the extension portion 15 of the first panel substrate 11.

In the mode of the display device 1D, the electrodes formed on both panel substrates are oriented back to back, and the electrode wire lines 24 and 26 are provided on the same face on which the electrodes (27, 28, etc.) are provided on the second panel substrate 21. Therefore, bending the protrusion 25 to make it pass through the opening 16 formed on the first panel substrate 11 allows the electrode wire lines 24 and 26 to be connected to the electrodes 14 on the extension portion 15.

Figure 7A:
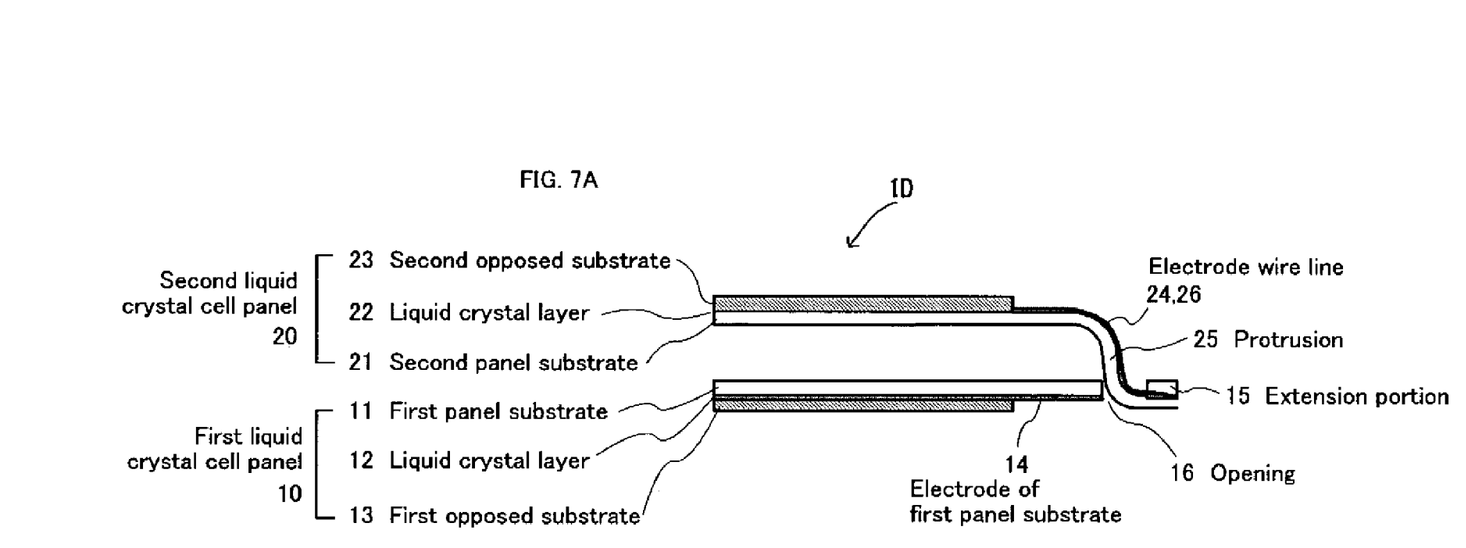
FIG. 7 is a cross section view and a top view showing a display device in a fourth embodiment of the present invention.

FIG. 7A is a diagram showing the cross section of the first liquid crystal cell panel 10 and the second liquid crystal cell panel 20. As shown in the figure, the protrusion 25 of the second panel substrate is bent to allow the protrusion 25 to path through the opening 16 formed on the first panel substrate 11 to bring the electrode wire lines 24 and 26 under the first panel substrate 11 so that the electrode wire lines 24 and 26 make contact with two of the electrodes 14 on the extension portion 15 of the first panel substrate 11 from under the electrodes 14 for making electrical connection.

Figure 7B:
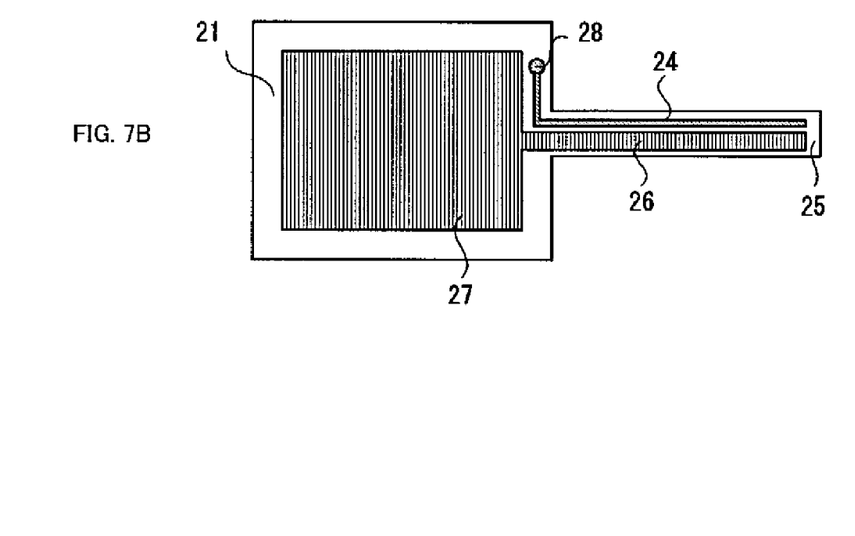

FIG. 7B is a top view of one mode of the second panel substrate 21. In this mode, a part of one side of the second panel substrate 21 is protruded to form the protrusion 25 on which the electrode wire lines 24 and 26 are provided. The electrode wire line 24 is connected via a vertical conducting via area 28 to a solid electrode in an area overlapping two-dimensionally with a shutter 27 of a second opposed substrate 23. The electrode wire line 26 is connected to a second shutter 27.

Figure 8A:
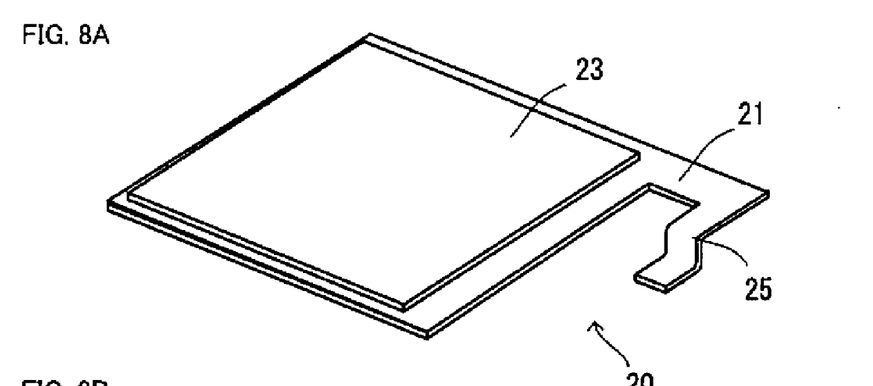
FIG. 8 is a perspective view showing the display device in the fourth embodiment of the present invention.
Figure 8B:
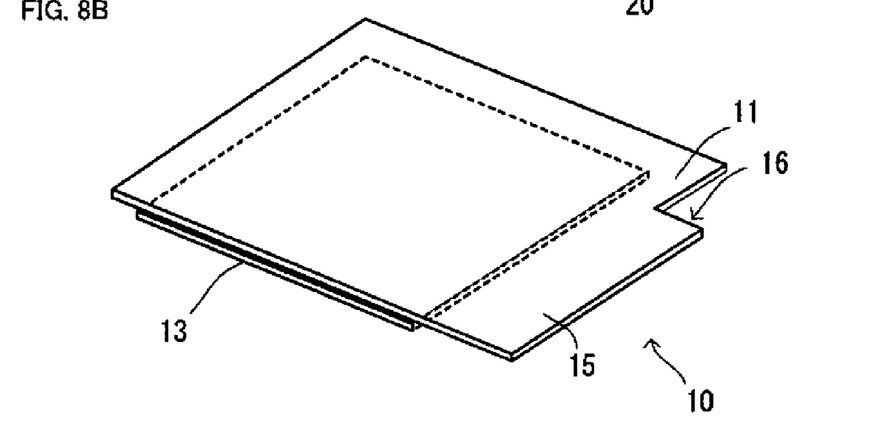
Figure 8C:
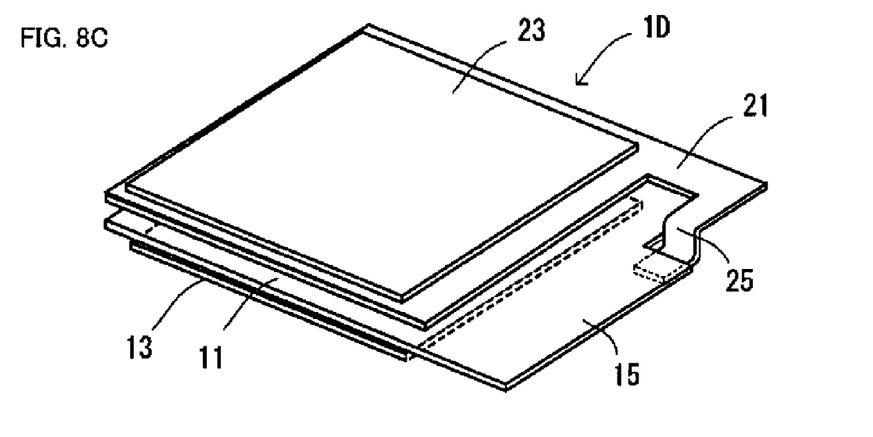

In the perspective view in FIG. 8, FIG. 8A shows the second liquid crystal cell panel 20, FIG. 8B shows the first liquid crystal cell panel 10, and FIG. 8C shows the display device 1D where the second liquid crystal cell panel 20 is laminated on the first liquid crystal cell panel 10.

The protrusion 25 of the second liquid crystal cell panel 20 is bent and the leading portion of the protrusion 25 is made to pass through the opening 16 so that the leading portion comes under the first panel substrate 11 to allow the electrode wire lines 24 and 26, formed on the protrusion 25, to make contact with two of the electrodes 14 on the extension portion 15 side of the first liquid crystal cell panel 10 from under the electrodes 14 for making electrical connection.

In the first embodiment to the fourth embodiment described above, two layers of liquid crystal cell panels are laminated to configure a two-layer liquid crystal display device.

Next, an example of a three-layer liquid crystal display device, which is configured by laminating three layers of liquid crystal cell panels, will be described with reference to FIG. 9 to FIG. 10 by combining the first to fourth embodiments (display devices 1A-1D) described above.

Figure 9A:
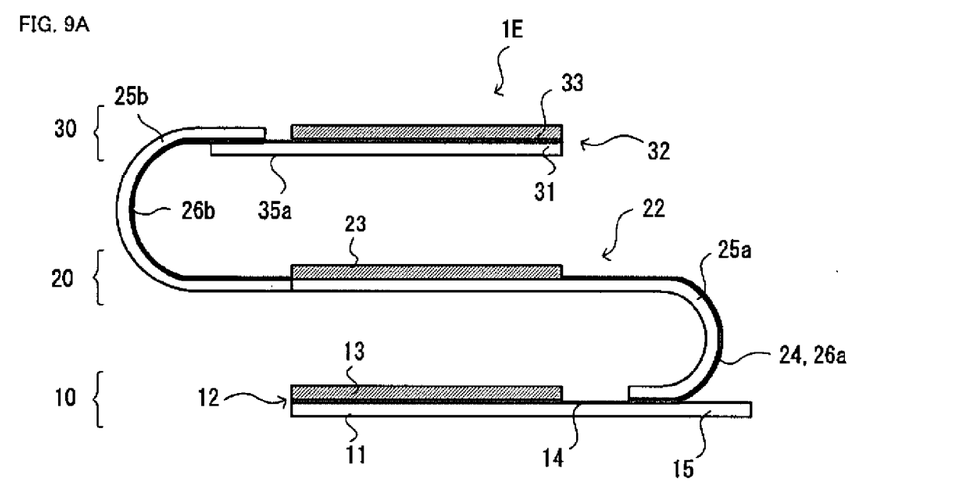
FIG. 9 is a cross section view and a top view showing a display device in a fifth embodiment of the present invention.
Figure 9B:
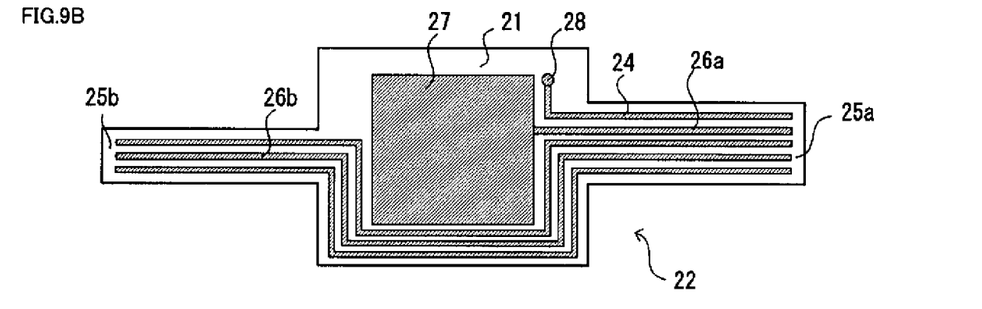
Figure 9C:
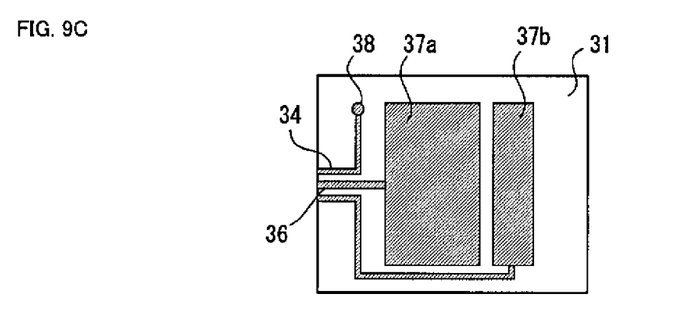
Figure 10:
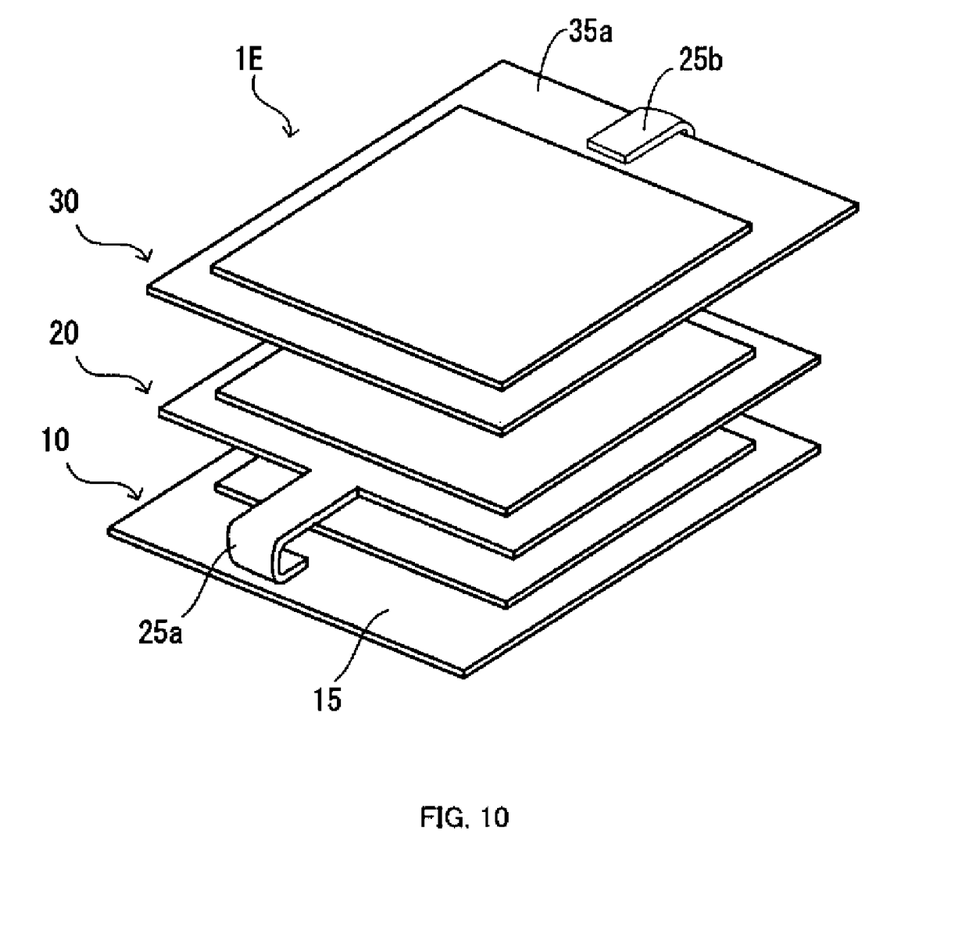
FIG. 10 is a perspective view showing the display device in the fifth embodiment of the present invention.

The following describes a display device in a fifth embodiment of the present invention with reference to the cross section view and the top view in FIG. 9 and the perspective view in FIG. 10.

A display device 1E, which is an example of configuration in which two configurations of the display device 1A described above are combined, comprises a first liquid crystal cell panel 10, a second liquid crystal cell panel 20, and a third liquid crystal cell panel 30. In this embodiment, the liquid crystal cell panels are laminated in order of a matrix TFT liquid crystal panel which is the first liquid crystal cell panel 10, a viewing angle adjustment panel which is the second liquid crystal cell panel 20, and a polymer network liquid crystal cell panel (hereinafter called a PN cell panel) which is the third liquid crystal cell panel 30.

The first liquid crystal cell panel 10 comprises a first panel substrate 11 and a first opposed substrate 13 with a liquid crystal layer 12 on the first panel substrate 11. The first panel substrate 11 is made of a rigid material, such as a glass substrate, with an extension portion 15 provided at least at one of its sides. The extension portion 15 is a portion that makes contact with a protrusion 25a of the second liquid crystal cell panel 20 for making electrical connection with it.

On the extension portion 15 are provided electrodes 14 of the first panel substrate. Five of the electrodes 14 are electrically connected to electrode wire lines 24, 26a, and 26b provided on the protrusion 25a of the second liquid crystal cell panel 20.

The third liquid crystal cell panel 30 comprises a third panel substrate 31 and a third opposed substrate 33 with a liquid crystal layer 32 on the third panel substrate 31. The third panel substrate 31 is made of a rigid material, such as a glass substrate, with an extension portion 35a provided at least at one of its sides. The extension portion 35a is a portion that makes contact with a protrusion 25b of the second liquid crystal cell panel 20 for making electrical connection.

On the extension portion 35a are provided electrodes of the third panel substrate. Three of the electrodes of this panel substrate electrodes are electrically connected to the electrode wire line 26b provided on the protrusion 25b of the second liquid crystal cell panel 20.

On the other hand, a second panel substrate 22 is made of a flexible material, such as a plastic substrate, with two protrusions 25a and 25b provided. The protrusion 25a is a portion that makes contact with the extension portion 15 of the first liquid crystal cell panel 10 for making electrical connection with the electrodes 14 of the first panel substrate, and the protrusion 25b is a portion that makes contact with the extension portion 35a of the third liquid crystal cell panel 30 for making electrical connection with the electrodes of the third panel substrate. The protrusion 25a and the protrusion 25b may be formed on the same side, or different sides, of the second liquid crystal layer 22. FIG. 9 and FIG. 10 show an example of the configuration in which the protrusions are formed on both ends of the second panel substrate 22.

The electrode wire lines 24, 26a, and 26b are provided on the protrusion 25a, and three electrode wire lines 26b are provided on the protrusion 25b. The leading portions of the electrode wire lines 24, 26a, and 26b on the protrusion 25a are electrically connected to five of the electrodes 14 of the panel substrate provided on the extension portion 15 side of the first liquid crystal cell panel 10, and the leading portions of the electrode wire lines 26b on the protrusion 25b are electrically connected to panel substrate electrodes 34 and 36 provided on the extension portion 35a side of the third liquid crystal cell panel 30. The protrusion 25a of the second panel substrate 21 is bent 180 degrees with respect to the protrusion direction to turn inside out so that the leading portions of the electrode wire lines 24, 26a, and 26b are connected to the electrodes 14 on the extension portion 15 of the first panel substrate 11. On the other hand, the protrusion 25b of the second panel substrate 21 is bent 180 degrees with respect to the protrusion direction of the protrusion 25b to turn inside out so that the leading portions of the electrode wire lines 26b are connected to the electrodes 34 and 36 provided on the extension portion 35 of the third panel substrate 31.

In the mode of the display device 1E, the electrodes formed on the three panel substrates are oriented in the same direction. Therefore, bending the protrusions 25a and 25b 180 degrees with respect to their protrusion directions to turn them inside out allows the electrode wire lines 24, 26a, and 26b to be connected to the electrodes on the extension portions 15 and 35.

FIG. 9A is a cross section view of the first liquid crystal cell panel 10, second liquid crystal cell panel 20, and third liquid crystal cell panel 30. The protrusions 25a and 25b of the second liquid crystal cell 20 panel are bent to reverse the vertical relation of the electrode wire lines 26 so that the electrode wire lines make contact with the electrodes 14 on the extension portion 15 of the first panel substrate 11 or with the electrodes 34 and 36 on the extension portion 35 of the third panel substrate 31 for making electrical connection.

FIG. 9B is a top view of the second panel substrate 21. In this mode, a part of two sides the second panel substrate 21 are protruded to form the protrusions 25a and 25b. The electrode wire lines 24 and 26a and three electrode wire lines 26b are provided on the protrusion 25a, and the three electrode wire lines 26b are provided on the protrusion 25b.

The electrode wire line 24 is connected to a vertical conducting via area 28 of the second panel substrate 21, and the electrode wire line 26a is connected to the shutter 27 provided in the main part of the second panel substrate 21. The second opposed substrate 23 has a solid electrode in an area overlapping two-dimensionally with the shutter 27, and the solid electrode and the vertical conducting via area 28 are connected via silver paste. The remaining three electrode wire lines 26b are not connected to the electrode wire lines of the shutter 27 and the vertical conducting via area 28 of the second panel substrate.

FIG. 9C is a top view of the third panel substrate 31. The electrode wire line 34 and two electrode wire lines 36 are provided on the extension portion 35a, the electrode wire line 34 is connected to a vertical conducting via area 38, and the electrode wire line 36 is connected to shutters 37a and 37b. The shutters 37a and 37b overlap two-dimensionally with the shutter 27 of the second opposed substrate 23. In addition, the third opposed substrate 33 has a solid electrode in an area overlapping two-dimensionally with the shutters 37a and 37b. The solid electrode and the vertical conducting via area 38 are connected via silver paste.

The operation of the viewing angle adjustment panel, which is the second liquid crystal cell panel 20, is the same as that of the viewing angle adjustment panel of the display device 1A. The PN cell panel, which is the third liquid crystal cell panel, becomes clouded when a voltage is not applied between the opposed electrodes, and becomes transparent when a predetermined voltage or higher is applied. For example, if the shutter 37a is made transparent and the shutter 37b is made clouded, the part corresponding to the shutter 37a of the display screen of the first liquid crystal cell panel 10 becomes clear and the remaining part becomes blurred. In this way, the screen becomes partially blurred by using the PN liquid crystal cell panel on the viewer's side.

The perspective view in FIG. 10 shows a display device 1E in which the second liquid crystal cell panel 20 is laminated on the first liquid crystal cell panel 10 and the third liquid crystal cell panel 30 is laminated on the second liquid crystal cell panel 20.

The protrusions 25a and 25b of the second liquid crystal cell panel 20 are bent, and the electrode wire lines 24, 26a, and 26b, formed on the protrusions 25a and 25b, are brought into contact with the electrodes 14 on the extension portion 15 side of the first liquid crystal cell panel 10, or with the electrodes 34 and 36 on the extension portion 35 side of the third liquid crystal cell panel 30, for making electrical connection.

The examples of configuration described above are exemplary only. The present invention is not limited to those examples but includes various modifications.

The invention claimed is:

1. A display device having multiple-layer liquid crystal cell panels, comprising:
   a first liquid crystal cell panel; and
   a second liquid crystal cell panel which are stacked in layers, said first liquid crystal cell panel having a first opposed substrate laminated on a rigid first panel substrate with a liquid crystal layer between said first opposed substrate and said first panel substrate, said second liquid crystal cell panel having a second opposed substrate laminated on a flexible second panel substrate with a liquid crystal layer between said second opposed substrate and said second panel substrate, wherein at least a part of said second panel substrate is bent to allow said second panel substrate to be connected to electrodes formed on said first panel substrate, said first panel substrate has an extension portion formed by extending at least one end thereof beyond said first opposed substrate and said electrodes are formed on said extension portion.

2. The display device according to claim 1 wherein said second panel substrate has a protrusion, which is a part of said second panel substrate protruded from at least one end thereof, and electrode wire lines for making connection with said electrodes are provided on said protrusion and said protrusion is bent to allow said electrode wire lines to be connected to said electrodes.

3. The display device according to claim 2 wherein the electrodes of said first panel substrate are provided on a substrate face facing a first opposed substrate, electrodes of said second panel substrate are provided on a substrate face facing a second opposed substrate, the first liquid crystal cell panel and the second liquid crystal cell panel are laminated with said first opposed substrate and said second panel substrate opposed each other and the protrusion of said second panel substrate is bent 180 degrees with respect to a protrusion direction thereof to turn inside out to allow leading positions of said electrode wire lines to be connected to the electrodes on the extension portion of said first panel substrate.

4. The display device according to claim 2 wherein the electrodes of said first panel substrate are provided on a substrate face facing a first opposed substrate, electrodes of said second panel substrate are provided on a substrate face facing a second opposed substrate, the first liquid crystal cell panel and the second liquid crystal cell panel are laminated with said first opposed substrate and said second opposed substrate opposed each other and the protrusion of said second panel substrate is bent with respect to a protrusion direction thereof without turning inside out to allow leading positions of said electrode wire lines to be connected to the electrodes on the extension portion of said first panel substrate.

5. The display device according to claims 2 wherein said first panel substrate is a glass substrate and said second panel substrate is a plastic substrate.

6. The display device according to claim 5 wherein the electrodes of said second panel substrate and the electrode wire lines provided on said protrusion are formed integrally with ITO(Indium Tin Oxide).

7. The display device according to claim 5 wherein said second liquid crystal cell panel is a cell panel configuring a viewing angle adjustment panel and said wire lines are two lines for controlling on/off states.

8. The display device according to claim 5 wherein said second liquid crystal cell panel is a cell panel configuring a touch entry panel and said wire lines includes two wire lines for controlling touch entry panel positions.

9. The display device according to claim 2 wherein the electrodes of said second panel substrate and the electrode wire lines provided on said protrusion are formed integrally with ITO(Indium Tin Oxide).

10. The display device according to claim 2 wherein said second liquid crystal cell panel is a cell panel configuring a viewing angle adjustment panel and said wire lines are two lines for controlling on/off states.

11. The display device according to claim 2 wherein said second liquid crystal cell panel is a cell panel configuring a touch entry panel and said wire lines includes two wire lines for controlling touch entry panel positions.

12. The display device according to claim 1 wherein said first panel substrate is a glass substrate and said second panel substrate is a plastic substrate.

13. The display device according to claim 12 wherein the electrodes of said second panel substrate and the electrode wire lines provided on said protrusion are formed integrally with ITO(Indium Tin Oxide).

14. The display device according to claim 12 wherein said second liquid crystal cell panel is a cell panel configuring a viewing angle adjustment panel and said wire lines are two lines for controlling on/off states.

15. The display device according to claim 12 wherein said second liquid crystal cell panel is a cell panel configuring a touch entry panel and said wire lines includes two wire lines for controlling touch entry panel positions.

16. The display device according to claim 1 wherein said first panel substrate is a glass substrate and said second panel substrate is a plastic substrate.

17. The display device according to claim 16 wherein the electrodes of said second panel substrate and the electrode wire lines provided on said protrusion are formed integrally with ITO(Indium Tin Oxide).

18. The display device according to claim 16 wherein said second liquid crystal cell panel is a cell panel configuring a viewing angle adjustment panel and said wire lines are two lines for controlling on/off states.

19. The display device according to claim 16 wherein said second liquid crystal cell panel is a cell panel configuring a touch entry panel and said wire lines includes two wire lines for controlling touch entry panel positions.

* * * * *

Disclaimer

7,911,560 — Kiyoshi Kamiya, Saitama (JP). MULTIPLE-LAYER LIQUID CRYSTAL DISPLAY DEVICE HAVING A FLEXIBLE SUBSTRATE. Patent dated March 22, 2011. Disclaimer filed May 20, 2011, by the inventor Kiyoshi Kamiya.

Hereby disclaims claims 16-19 of the patent.

*(Official Gazette, January 31, 2012)*